United States Patent [19]

Bourgault

[11] Patent Number: 5,592,889
[45] Date of Patent: Jan. 14, 1997

[54] MULTI COMPARTMENT AIR SEEDER

[75] Inventor: Gerard F. J. Bourgault, St. Brieux, Canada

[73] Assignee: Bourgault Industries Ltd., St. Brieux, Canada

[21] Appl. No.: 459,773

[22] Filed: Jun. 2, 1995

[51] Int. Cl.$^6$ .......................... A01C 15/04; B65G 11/00
[52] U.S. Cl. ........................ 111/174; 111/178; 222/129
[58] Field of Search .................................. 111/174, 925, 111/52, 178, 200, 900; 406/1, 39, 56, 119, 120, 123, 182; 105/248; 222/129, 185.1

[56]  References Cited

U.S. PATENT DOCUMENTS

| 492,479 | 2/1893 | Tuggle | 222/129 |
|---|---|---|---|
| 964,245 | 7/1910 | Hadley | 222/129 |
| 4,296,695 | 10/1981 | Quanbeck . | |
| 4,379,664 | 4/1983 | Klein et al. | 111/174 |
| 4,473,016 | 9/1984 | Gust . | |
| 4,485,939 | 12/1984 | Gafford et al. . | |
| 4,700,640 | 10/1987 | Andersson | 222/129 |
| 4,779,765 | 10/1988 | Neumeyer | 111/174 |
| 4,834,004 | 5/1989 | Butuk et al. . | |
| 5,080,259 | 1/1992 | Hadley | 222/185.1 |
| 5,147,152 | 9/1992 | Link | 406/1 |
| 5,189,965 | 3/1993 | Hobbs et al. | 111/174 |

FOREIGN PATENT DOCUMENTS

| 1689251 | 11/1991 | U.S.S.R. | 406/119 |

Primary Examiner—Terry Lee Melius
Assistant Examiner—Robert Pezzuto
Attorney, Agent, or Firm—Wenderoth, Lind & Ponack

[57] ABSTRACT

The present invention lies in a three hopper bin air seeder. The contents of the central hopper bin are capable of being emptied into the rear hopper bin or the front hopper bin, or when central hopper bin ports are closed, the contents of the central hopper bin can be directed into a primary conveyance duct. The invention also employs a pair of blower fans and three pressurized ducts. By using flexible and moveable couplings, the contents of any two or three hopper bins can be combined into a single particulate stream. Similarly, three separate streams of material such as seed, fertilizer or granular herbicide can be directed to various soil working tools on a cultivator, or other seeding device.

7 Claims, 8 Drawing Sheets

MULTI COMPARTMENT AIR SEEDER

This invention relates to agricultural air seeders and particularly to multi-compartment air seeders.

BACKGROUND

The farming industry is continuing to follow the long established trend of fewer farmers working more land. Because farmers still have to seed their entire crop in the same window of time, they must find equipment that will allow them to accomplish their seeding within the window as efficiently as possible. Other recent trends include farmers seeding a large number of crop types, accomplishing chemical application—fertilizing and seeding in one pass and side banding the fertilizer from the seed. Farmers use air seeders to perform these functions because of the ease of filling, unloading, transport, and the low cost of maintenance.

In the present seeder designs there are generally two compartments although from time to time a third, individual and separate compartment has been added. The problem is that the design does not really lend itself to anything other than applying herbicide or broadcasting fine seeds with the third tank. Often one hopper bin would not be used at all for particular operations.

SUMMARY OF THE INVENTION

It is therefore an object of the present invention to provide an air seeder wherein the compartments are interconnected. The seed can be placed in the central, rear and front compartments, and all metered into a single stream.

It is also an object of the present invention to provide a plurality of flexible, moveable primary conveyance ducts wherein seed and fertilizer may be either combined or kept separate, depending upon the application.

The present invention comprises a three-compartment air seeder that provides an operator with more versatility and capability than any other air seeder previously developed. The three tanks can be configured or combined as the operator sees fit to make the particular task undertaken as efficient as possible. The center tank can be used independently or trap doors can be opened or closed to allow the contents to flow into either or both of the other two tanks.

The other components of the design of this air seeder are conveyance tubes, or primary distribution ducts. The contents of the three-tanks can be directed into three separate conveyance tubes or the contents can be combined as the operator requires. The contents of the front and rear tanks can run into a common air stream or run out separately to the earth engaging implement. The contents of the third tank can flow into a separate conveyance tube or can be combined with the contents of the front and/or rear tanks.

The present invention allows the operator to utilize the full tank capacity in virtually every application. The tank design, coupled with a transfer tube design, allows for a maximum amount of combinations.

Therefore, this invention seeks to provide an air seeder comprising: a rear hopper bin; a central hopper bin; a front hopper bin; at least one blower fan; and a plurality of conveyance ducts; said hopper bins being adapted to hold at least one of seed, fertilizer or granular herbicide and being supported by a wheeled cart; said central hopper bin including a front and rear closeable port opening, wherein in operation, said front port opening is adapted to permit contents of said central hopper bin to enter said front hopper bin when a front port opening door is removed, and said rear port opening is adapted to permit the contents of said central hopper bin to enter said rear hopper bin when a rear port opening door is removed.

The versatility and flexibility of this system are fully exploited when using two blower fans, and three primary conveyance ducts. Two of the ducts receive pressurized air from one blower fan and a third receives pressurized air from a second blower fan. The first two ducts include closure valves, such that one or the other, or both ducts can be used.

The contents of the rear tank are always directed to the third primary conveyance duct and the contents of the front tank are always dispensed into the second conveyance duct. However, with the help of flexible crossover elbows, the contents of the third conveyance duct can be transferred to the first conveyance duct, thus forming a single stream. This would be useful, for instance, when seed is being used in both front and rear hopper bins.

The central tank augering meter is coupled to a 4 inch granular herbicide applicator hose duct which is flexible and can be coupled to a drop tube or connected to a multi-shoot T-joint located on each of the three primary distribution ducts. When a T-junction is not connected to the hose duct, a cover is placed thereon. Thus, the contents of the central tank can be placed in any one of the three conveyance ducts, as required.

BRIEF DESCRIPTION OF THE DRAWINGS

The invention will be more fully described in conjunction with the following drawings wherein.

DETAILED DESCRIPTION OF THE PREFERRED EMBODIMENTS

Figure 1:
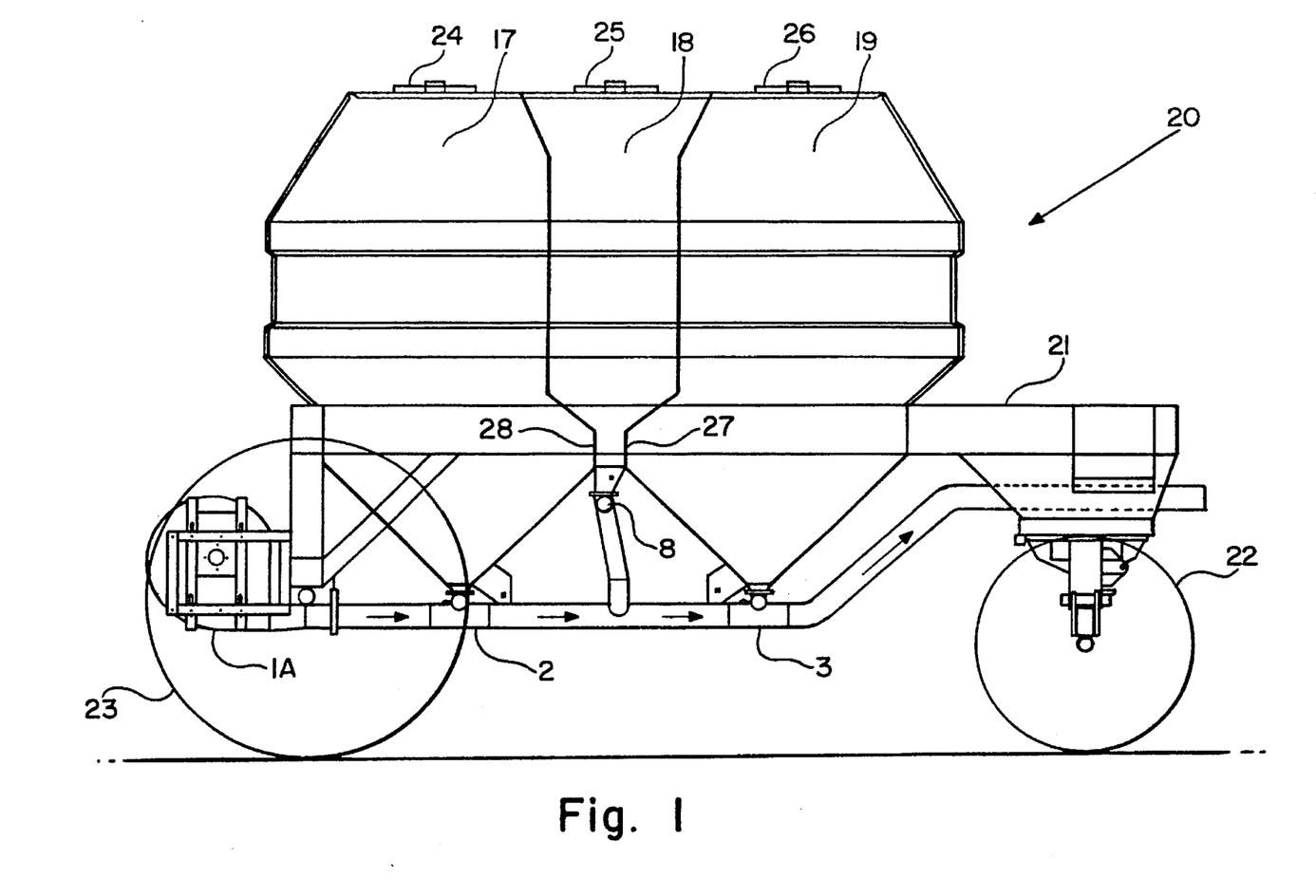
FIG. 1 is a partially cutaway side view of the air seeder of the present invention.
Figure 2:
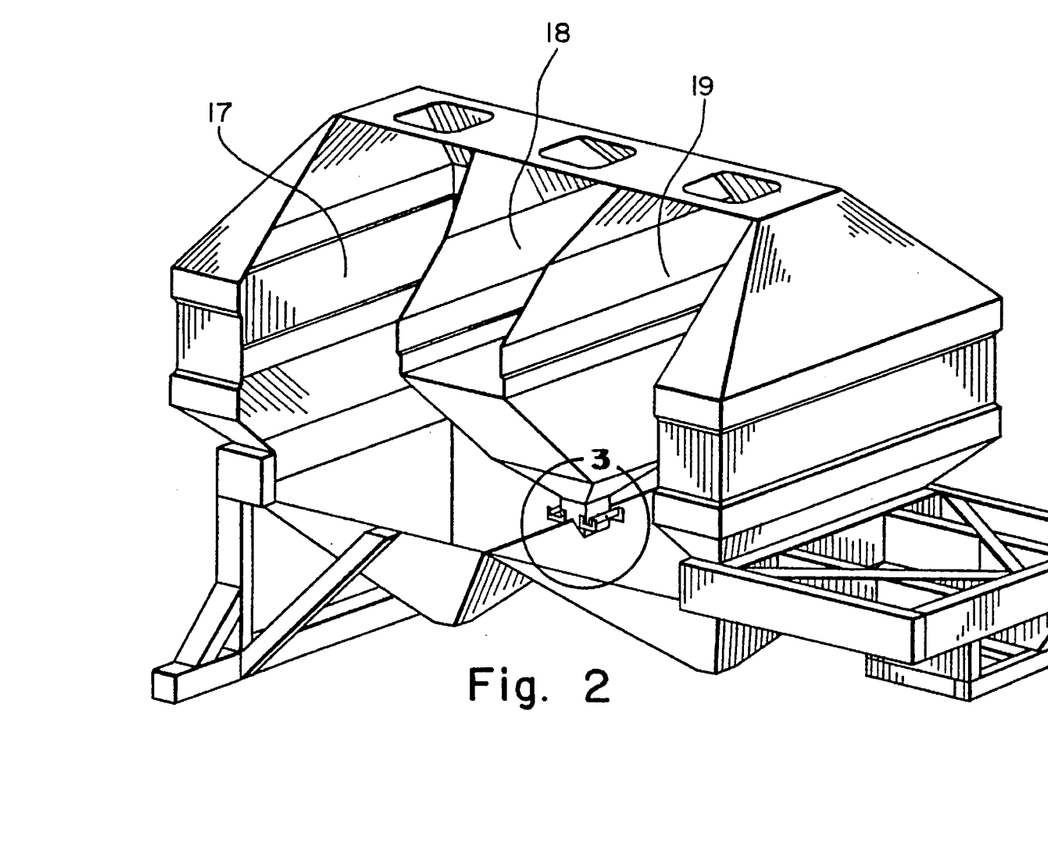
FIG. 2 is an isometric view of the internal tank layout.
Figure 3:
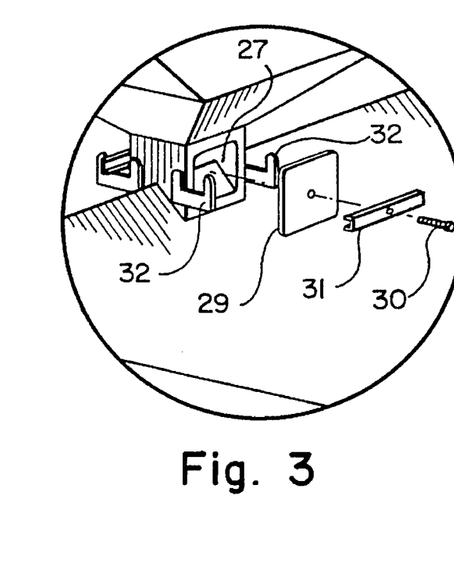
FIG. 3 is an exploded view of the lower port openings located in the central compartment.

In FIG. 1, an air seeder, shown generally as 20, has a rear tank 17, a central tank 18, and a front tank 19. The tanks are in the form of hoppers and are adapted to be filled with seed, fertilizer or granular herbicide. The tanks or hopper bins, 17, 18, and 19, are supported on a frame 21, supported by wheels 22,23. The air seeder is equipped with a pair of blower fans at the rear. Only fan 1A is visible in FIG. 1. Each of the hoppers or bins has a filler hole 24,25 and 26. On the lowermost portion of each tank is a metering auger. These are shown as 2 under the rear tank, 8 under the center tank, and 3 under the front tank. The center tank also has a front and rear port opening which can be closed when not in use. Thus the front port opening shown as 27, and the rear port opening shown as 28, are adapted to permit the contents of the center tank to flow into the front tank 19 or rear tank 17, respectively. Small closure doors, as seen in FIGS. 2 and 3, are put in place over the port openings and inserted from inside the front tank and rear tank, respectively;

FIG. 2 is an isometric view of the hopper bins 17, 18 and 19;

FIG. 3 is an exploded view showing port opening 27 with door closure brackets 32, door 29, pin 30, and handle 31. The port doors must be put in place or removed prior to filling the tanks.

FIGS. 4 through 9 represent various configurations of the conveyance ducts. By examining several examples, one can see the versatility of the invention.

Figure 4:
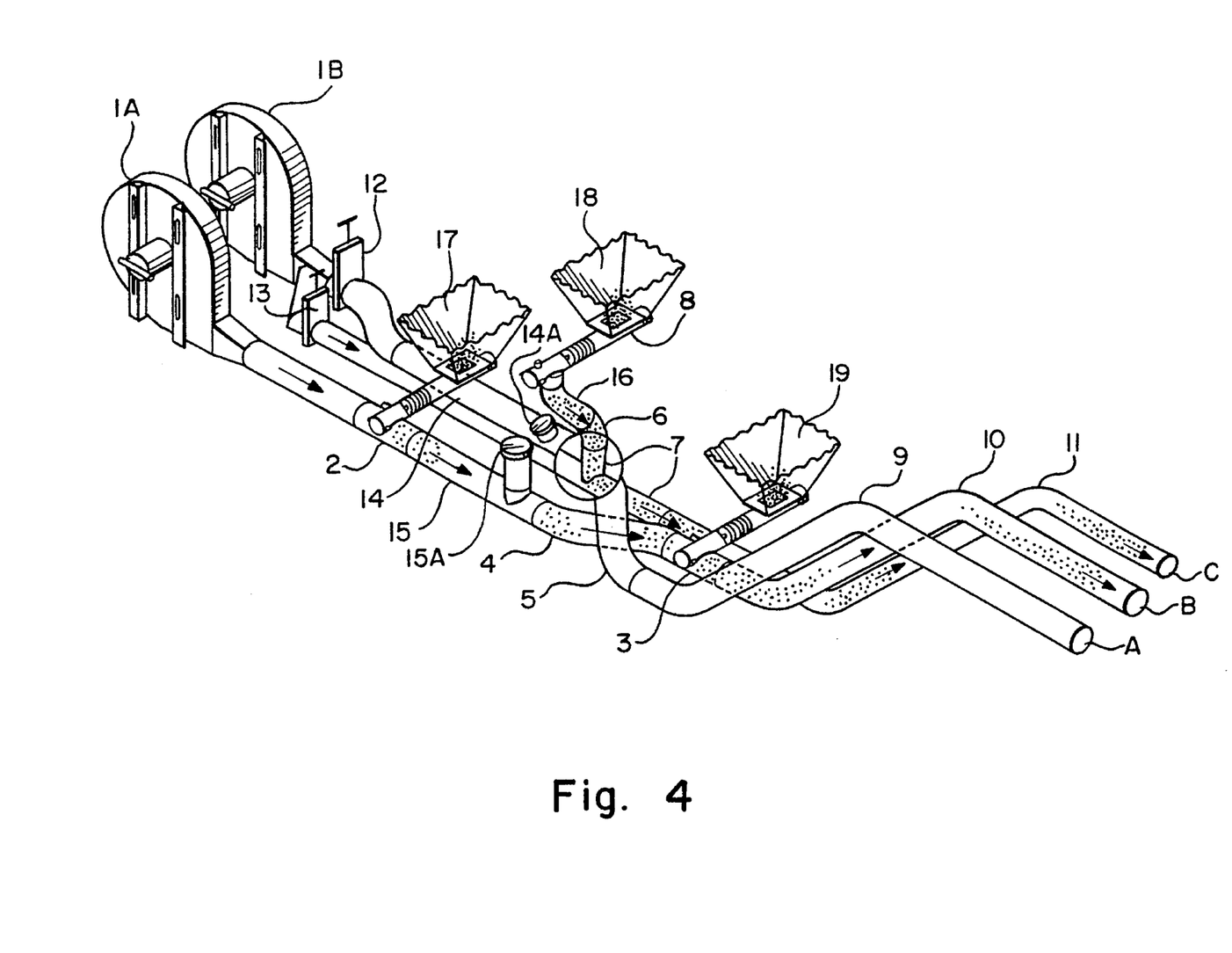
FIGS. 4 to 9 are schematic diagrams of various configurations of the conveyance ducts.
Figure 5:
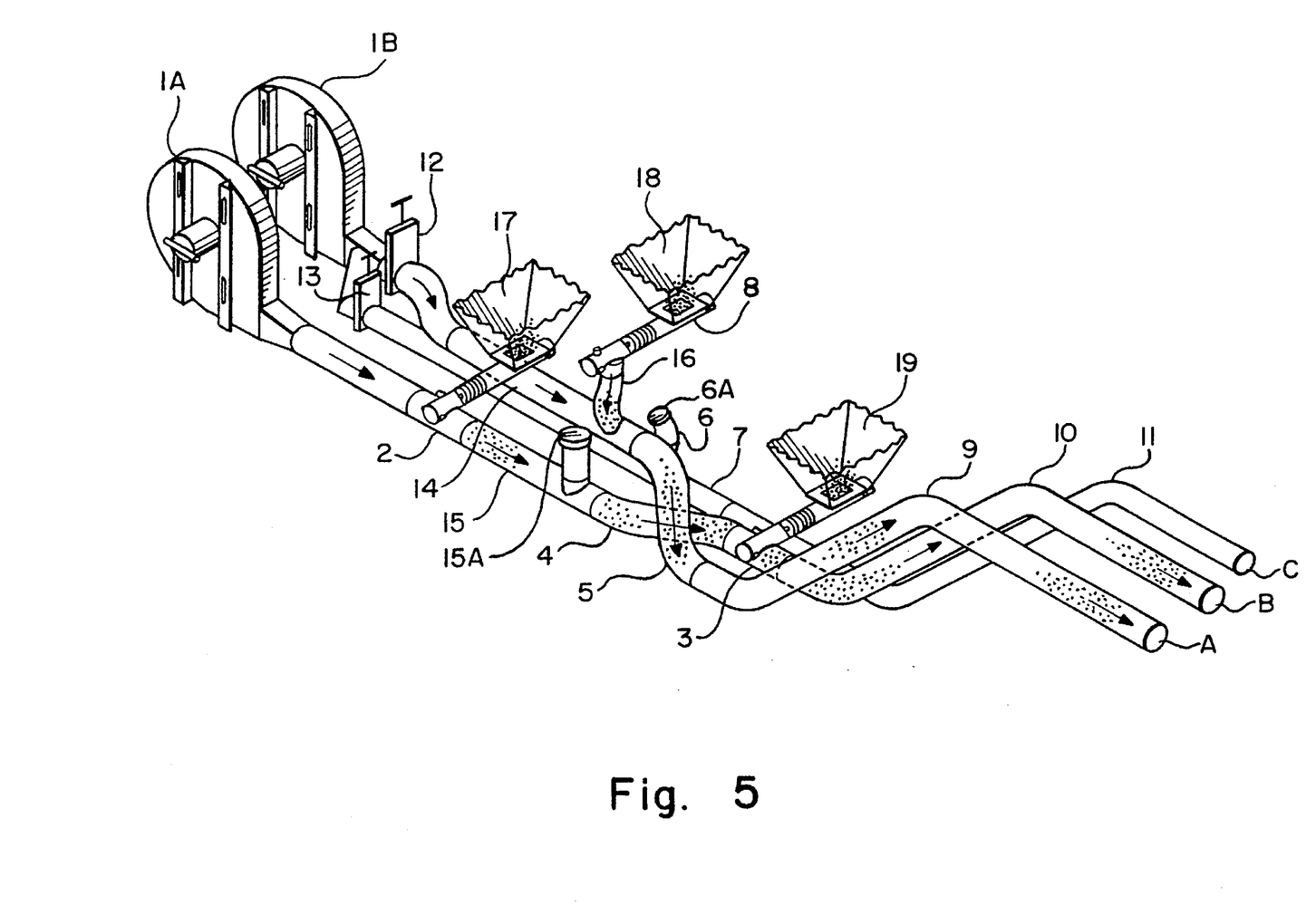
Figure 6:
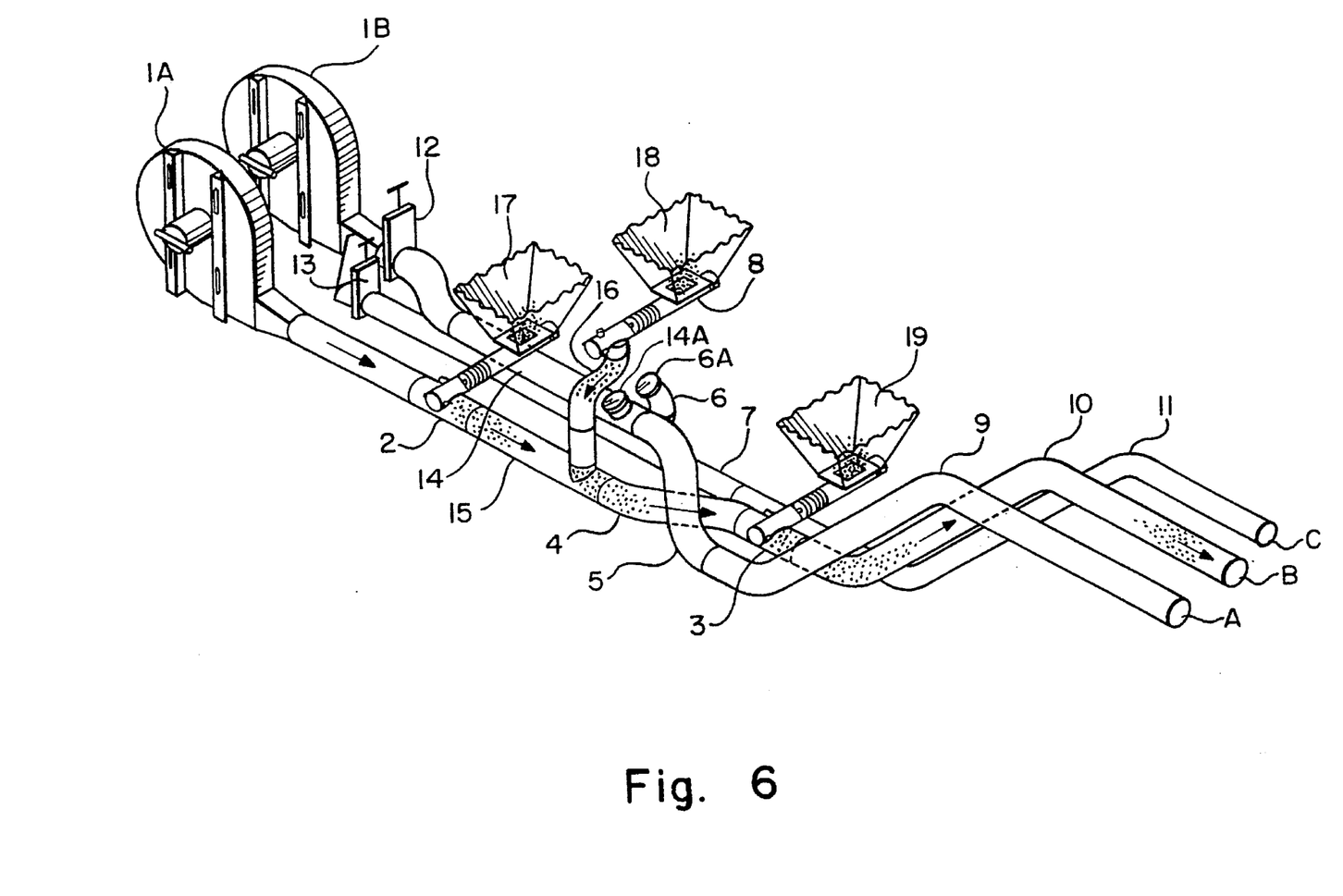
Figure 7:
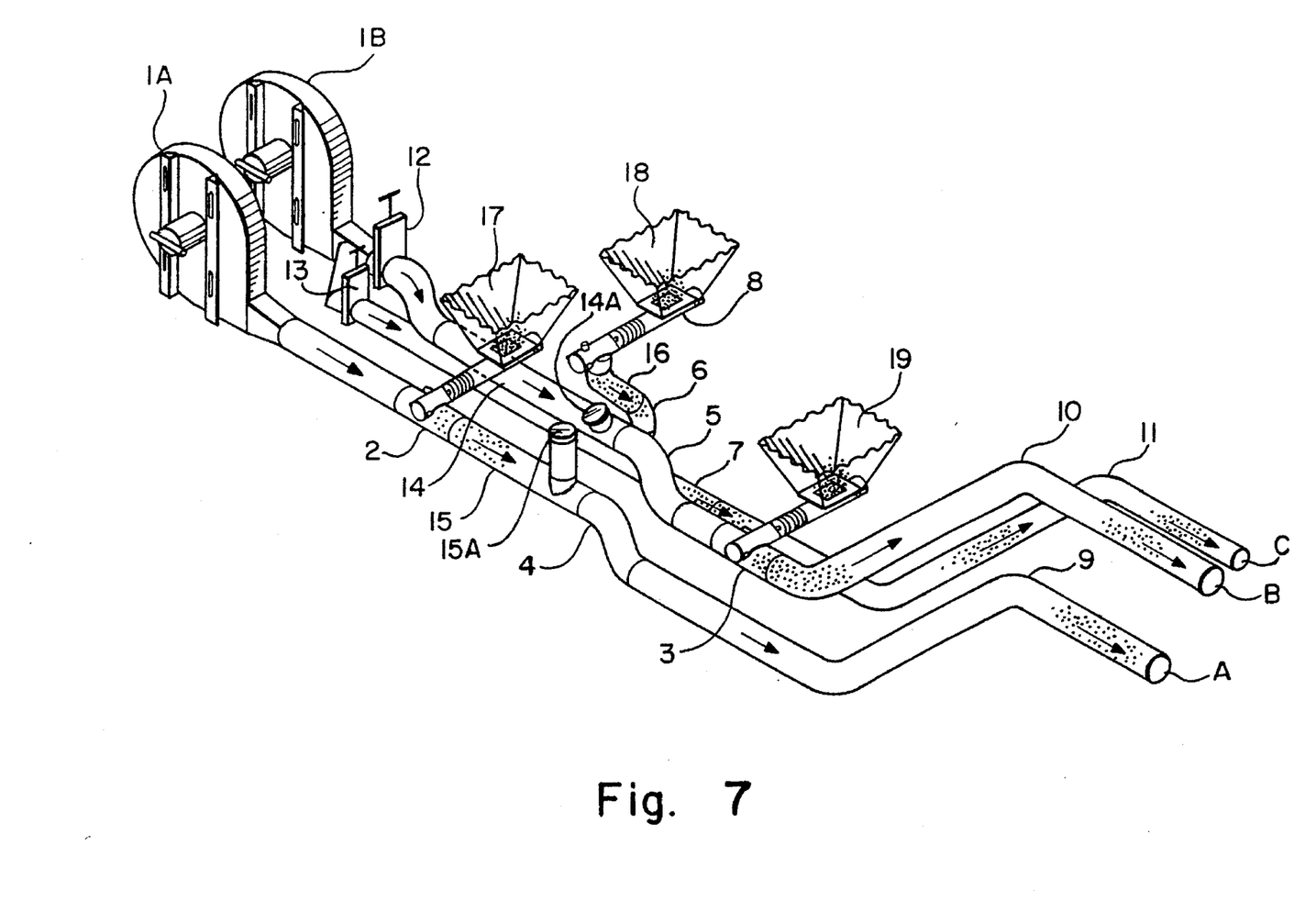
Figure 8:
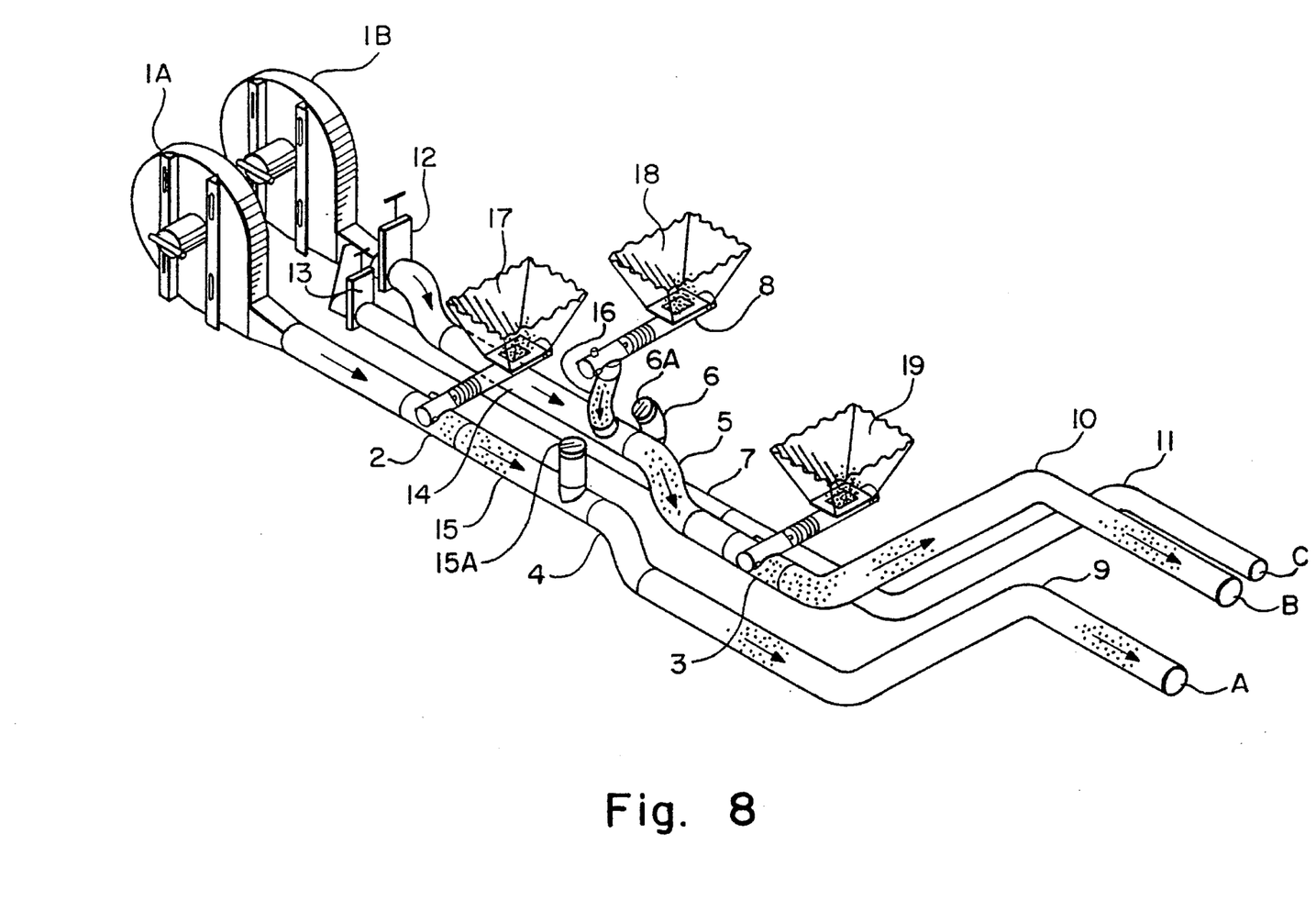

In FIG. 4, fan 1A will provide air flow for the product exiting at primary outlet B. Fan 1B will provide air flow for the product exiting at the 4 inch primary outlet C. In FIG. 4, no product exits through conveyance duct A. The air is split in the fan housing of fan 1B, supplying air flow for the 4 inch and 5 inch primary lines. The air flow can be regulated by the 5 inch valve 12 and the 4 inch valve 13.

In FIG. 4, since the 5 inch line exiting at primary outlet A is not in use, the 5 inch valve 12 is fully closed and the 4 inch valve 13 is fully open. In FIG. 4, material is first metered into the air stream from the rear tank 17 by the rear tank metering auger 2. The material is blown, by pressurized air from fan 1A, through multi-shoot T-joint 15, through 5 inch crossover elbow 4, past the front tank 19 metering auger 3. Here material from the front tank 19 is metered into the conveyance duct, mixing with material from the rear tank 17. The combined products then travel up 5 inch elbow 10 and to the product distribution kit (not shown), mounted on ground engaging implements. Thus, material from both front tank 19 and rear tank 17, exit through outlet B.

In FIG. 4, air also travels from fan 1B through 4 inch valve 13 and into 4 inch granular herbicide applicator T #7. Material from the center tank 18 is metered by the center tank metering auger 8, down the 4 inch granular herbicide applicator hose duct 16, and through 4 inch drop tube 6 into the 4 inch granular herbicide applicator T #7. The material then travels up the 4 inch granular herbicide applicator elbow 11, exiting at primary outlet C. The material then flows to a granular distribution kit (not shown) mounted on a ground engaging implement.

It can be seen in FIG. 4 that hose duct 16 and drop tube 6 can be maneuvered to fit on the T-junction of any one of the three principal conveyance tubes. One notes, in particular, in FIG. 4, that a cap 15A is placed on multi-shoot T #15 since the center tank is not being metered into tube B. Similarly a cap 14A is placed on T #14 since tube A is not being used.

In FIG. 5, another arrangement is illustrated. Fan 1A will provide air flow for the product exiting at the primary outlet B and fan 1B will provide air flow for the product exiting at primary outlet A. Since the 4 inch primary conveyance duct, that ends at primary out let C, is not in use, the 4 inch valve 13 will be fully closed, and the 5 inch valve 12 will be fully open. The material is first metered into the airstream from the rear tank 17 by the rear tank metering auger 2. The material then travels through the multi-shoot T #15 and through the 5 inch crossover elbow 4, to the front tank metering auger 3. Here material from the front tank 19 is metered into the primary conveyance duct, mixing material from the rear tank 17. The combined products then travel up the second 5 inch elbow 10 to the primary outlet B and to a product distribution kit (not shown) mounted on a ground engaging implement.

For material exiting at primary outlet A, material is metered into the airstream from the center tank 18 by center tank metering auger 8, down the 4 inch granular herbicide applicator hose duct 16, and into the multi-shoot 5 inch T #14. The material then travels down the 5 inch crossover elbow 5 into the 5 inch elbow 9 and out to the product distribution kit mounted on a ground engaging implement.

In FIG. 6, fan 1A will provide air flow for the product exiting at primary outlet B. In this example, material will not be required from primary outlets A and C, and therefore fan 1B will not be operating. In the example shown in FIG. 6 only the 5 inch primary conveyance duct which ends at primary outlet B is in use. The material is first metered into the airstream from the rear tank 17 by the rear tank metering auger 2. The material is then metered into the airstream from the center tank by the center tank metering, auger 8, down the 4 inch granular herbicide applicator hose duct 16, and into multi-shoot T #15. Note that cap 15A is no longer in place, while caps 14A and 6A are installed. The material travels through the 5 inch crossover elbow 4 to the front tank metering auger 3. Here material from the front tank 19 is metered into the primary conveyance duct, mixing with material from the rear 17, and center 18, tanks. The combined products then travel up the second 5 inch elbow 10, entering at primary outlet B out to the product distribution kit, mounted on the ground engaging implement.

In FIG. 7, fan 1A will provide air flow for the product exiting at the primary outlet A. Fan 1B will provide air flow for the product exiting at primary outlets B and C. It is to be noted in FIG. 7 that the two 5 inch crossover elbows 4 and 5 have been repositioned from the previous examples. Crossover elbow 4 has been rotated to tie fan 1A to primary outlet A, and crossover elbow 5 has been rotated to tie fan 1B to primary outlet B. The 4 inch valve 13 and the 5 inch valve 12 can be adjusted to regulate the air flow to primary outlets B and C. In the primary conveyance duct that exits at primary outlet B, air travels through the multi-shoot 5 inch T #14 and the 5 inch crossover elbow 5 to the front tank metering auger 3. Material from the front tank 19 is metered into the transfer line. The material then travels up the second 5 inch elbow 10 exiting at primary outlet B to the product distribution kit mounted on a ground engaging implement.

The material is metered into the 5 inch primary line from the rear tank 17 by the rear tank metering auger 2. It then travels through the multi-shoot 5 inch T #15, and the 5 inch crossover elbow 4. The material then travels up the 5 inch elbow 9 and out primary outlet A. For the 4 inch primary conveyance duct, which exits at C, material from the center tank 18 is metered by the center tank metering auger 8, down the 4 inch granular herbicide applicator hose duct 16 and 4 inch drop tube 6 and into the 4 inch granular herbicide applicator T #7. The material then travels up the 4 inch granular herbicide applicator elbow 11, out the primary outlet C, and into the granular distribution kit mounted on the ground engaging implement. One notes that caps 15A and 14A are respectively in place over multi-shoot T #15 and multi-shoot T #14.

In FIG. 8, the primary conveyance duct exiting at primary outlet A is attached to fan 1A and the primary conveyance duct exiting at outlet B is attached to fan 1B. The 4 inch line exiting at C is not being used. Therefore, the 4 inch valve 13 will be fully closed and the 5 inch valve 12 will be fully open.

Material is first metered into the airstream from the rear tank 17 by the rear tank metering auger 2. The material then travels through the multi-shoot 5 inch T #15, upon which a cap 15A has been placed. From there the material goes through the 5 inch crossover elbow 4 to the second 5 inch elbow 9, and material exits through primary outlet A.

In the second primary line material is metered into the airstream from the center tank 18 by the center tank metering auger 8, down the flexible 4 inch granular herbicide applicator hose duct 16, and into the multi-shoot 5 inch T #14. The 4 inch drop tube 6 is not in use and therefore cap 6A has been placed on it.

The material then travels down the 5 inch crossover elbow 5 and mixes with material from the front tank metering auger 3. The combined products then travel up the second five inch elbow 10 and out to the product distribution kit mounted on a ground engaging implement by a primary outlet B.

Figure 9:
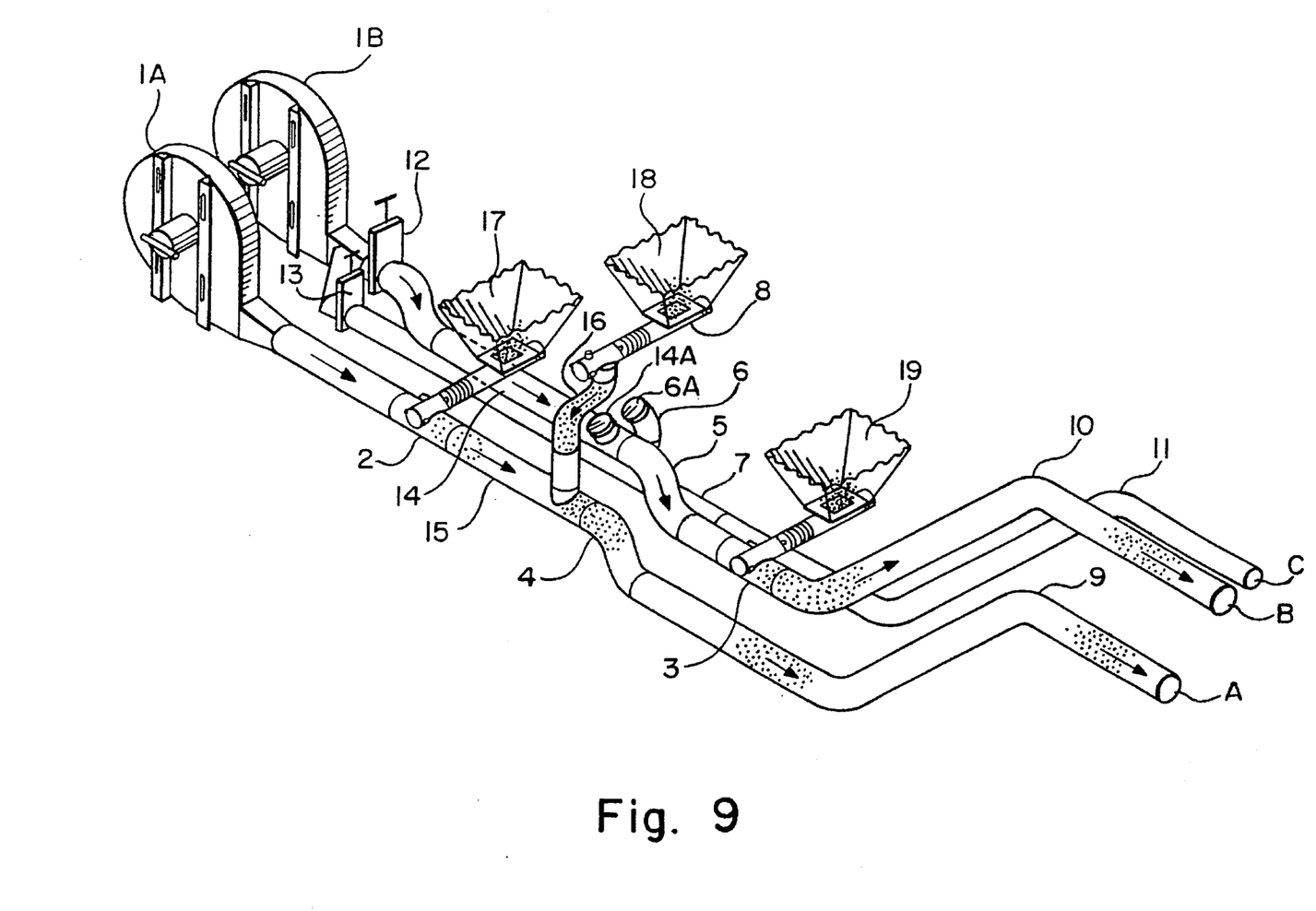

In FIG. 9, fan 1A will provide air flow for the products exiting at primary outlet A, and fan 1B will provide air flow for the product exiting at the primary outlet B. Since the 4 inch primary line C is not in use, the 4 inch valve 13 will be fully closed and the 5 inch valve 12 will be fully open. Since tube C is not in use, cap 6A has been placed on drop tube 6. In addition, cap 14A has been placed on multi-shoot tube 14. One notes also that crossover tubes 4 and 5 remain in the same position as in FIG. 7 and 8.

Material is first metered into the airstream from the rear tank 17 by the rear tank metering auger 2. The material is then metered into the airstream from the center tank 18 by the center tank metering auger 8. The material travels down the flexible 4 inch granular herbicide applicator hose duct 16 and into multi-shoot 5 inch T #15. The combined products then travel through the 5 inch crossover elbow 4, up the second 5 inch elbow 9, and out through the primary outlet A to a product distribution kit mounted on a ground engaging implement.

For the second conveyance duct, air travels through multi-shoot 5 inch T #14 and 5 inch elbow 5 to the rear tank metering auger 3. The material then travels up the second 5 inch elbow 10, and exits through primary outlet B.

As can be seen from the foregoing examples, the improved air seeder and conveyance duct arrangements of the present invention offer a wide range of versatility and uses to the farmer. Indeed, almost any combination is possible to permit maximum use of the air seeder tank capacity.

What I claim as my invention is:

1. An air seeder comprising:

a rear hopper bin;

a central hopper bin;

a front hopper bin;

at least one blower fan; and a plurality of conveyance ducts;

each of said hopper bins including a particle metering and dispensing device connected to a lowermost discharge port on each of said hopper bins;

said hopper bins further including an upper filler port;

said hopper bins being adapted to hold at least one of seed, fertilizer or granular herbicide and being supported by a wheeled cart;

said central hopper bin including a front and rear closeable port opening adjacent the bottom of said central hopper bin;

said front and rear closeable port openings being located substantially higher than said lowermost discharge ports on said front and rear hopper bin, such that in operation, said front port opening is adapted to permit contents of said central hopper bin to enter said front hopper bin when a front port opening door is removed, and said rear port opening is adapted to permit the contents of said central hopper bin to enter said rear hopper bin when a rear port opening door is removed.

2. An air seeder comprising:

a rear hopper bin;

a central hopper bin; and a front hopper bin;

said hopper bins being adapted to hold at least one of seed, fertilizer or granular-herbicide and being supported by a wheeled cart;

said central hopper bin including a front and rear closeable port opening, wherein in operation, said front port opening is adapted to permit contents of said central hopper bin to enter said front hopper bin when a front port opening door is removed, and said rear port opening is adapted to permit the contents of said central hopper bin to enter said rear hopper bin when a rear port opening door is removed;

said air seeder further comprising:

two blower fans; and first, second and third primary conveyance ducts;

said first and second primary conveyance ducts being adapted to receive pressurized air from one of said blower fans and said third primary conveyance duct being adapted to receive pressurized air from the other of said blower fans.

3. An air seeder as claimed in claim 2 wherein said first and second primary conveyance ducts include closure valves such that, in operation, the flow of pressurized air can be stopped in one or both of said first and second ducts.

4. An air seeder comprising:

a rear hopper bin;

a central hopper bin; and a front hopper bin;

said hopper bins being adapted to hold at least one of seed, fertilizer or granular herbicide and being supported by a wheeled cart;

said central hopper bin including a front and rear closeable port opening, wherein in operation, said front port opening is adapted to permit contents of said central hopper bin to enter said front hopper bin when a front port opening door is removed, and said rear port opening is adapted to permit the contents of said central hopper bin to enter said rear hopper bin when a rear port opening door is removed;

said air seeder further comprising;

two blower fans; and first, second and third primary conveyance ducts;

said first and second primary conveyance ducts being adapted to receive pressurized air from one of said blower fans and said third primary conveyance duct being adapted to receive pressurized air from the other of said blower fans;

wherein each of said first, second and third primary conveyance ducts each includes a closeable T-duct adapted to receive the contents of said central hopper bin, when in operation.

5. An air seeder comprising:.

a rear hopper bin;

a central hopper bin; and a front hopper bin;

each of said hopper bins including a particular metering and dispensing device connected to a lowermost discharge port on each of said hopper bins;

said hopper bins being adapted to hold at least one of seed, fertilizer or granular herbicide and being supported by a wheeled cart;

said central hopper bin including a front and rear closeable port opening, wherein in operation, said front port opening is adapted to permit contents of said central hopper bin to enter said front hopper bin when a front port opening door is removed, and said rear port opening in adapted to permit the contacts of said central hopper bin to enter said rear hopper bin when a rear port opening door is removed;

said air seeder further comprising;

two blower fans; and first, second and third primary conveyance ducts;

said first and second primary conveyance ducts being adapted to receive pressurized air from one of said blower fans and said third primary conveyance duct being adapted to receive pressurized air from the other of said blower fans;

said first, second and third primary conveyance ducts each including a closeable T-duct adapted to receive the contents of said central hopper bin;

wherein said metering and dispensing device connected to said central hopper bin is in open communication with a flexible hose duct;

said flexible hose duct being adapted to connect to any one of said closeable T-ducts;

such that in operation, the contents of said central bin can be combined with the contents of said rear hopper bin, said front hopper bin, or alternatively, be transported on its own through said second primary conveyance duct.

6. An air seeder as claimed in claim 5 wherein the metering and dispensing device connected to said rear hopper bin includes an auger, said device being permanently connected to said third primary conveyance duct;

and the metering and dispensing device connected to said hopper bin includes an auger, said device being permanently connected to said first primary conveyance duct.

7. An air seeder as claimed in claim 6 wherein said first and third primary conveyance ducts include flexible crossover elbows such that, in operation, the contents of said front hopper bin and said rear hopper bin can be combined into a single duct.

* * * * *